United States Patent
Feng

(10) Patent No.: US 11,256,902 B2
(45) Date of Patent: Feb. 22, 2022

(54) PEOPLE-CREDENTIALS COMPARISON AUTHENTICATION METHOD, SYSTEM AND CAMERA

(71) Applicant: Hangzhou Hikvision Digital Technology Co., Ltd., Zhejiang (CN)

(72) Inventor: Renguang Feng, Zhejiang (CN)

(73) Assignee: Hangzhou Hikvision Digital Technology Co., Ltd., Zhejiang (CN)

(*) Notice: Subject to any disclaimer, the term of this patent is extended or adjusted under 35 U.S.C. 154(b) by 90 days.

(21) Appl. No.: 16/606,435

(22) PCT Filed: Apr. 16, 2018

(86) PCT No.: PCT/CN2018/083217
§ 371 (c)(1),
(2) Date: Oct. 18, 2019

(87) PCT Pub. No.: WO2018/192448
PCT Pub. Date: Oct. 25, 2018

(65) Prior Publication Data
US 2020/0042772 A1    Feb. 6, 2020

(30) Foreign Application Priority Data
Apr. 20, 2017  (CN) .......................... 201710263608.7

(51) Int. Cl.
*G06K 9/00*    (2006.01)
*G06K 9/62*    (2006.01)

(52) U.S. Cl.
CPC ..... *G06K 9/00255* (2013.01); *G06K 9/00281* (2013.01); *G06K 9/6215* (2013.01)

(58) Field of Classification Search
CPC ............ G06K 9/6215; G06K 9/00281; G06K 9/00288; G06K 9/00255
See application file for complete search history.

(56) References Cited

U.S. PATENT DOCUMENTS 6,128,398 A * 10/2000 Kuperstein ........ G06K 9/00288
382/118
2002/0090116 A1* 7/2002 Miichi .................... G07C 9/37
382/118

(Continued)

FOREIGN PATENT DOCUMENTS

CN    103309851 A    9/2013
CN    103473529 A    12/2013

(Continued)

*Primary Examiner* — Vu Le
*Assistant Examiner* — Tracy Mangialaschi
(74) *Attorney, Agent, or Firm* — Bret E. Field; Bozicevic, Field & Francis LLP

(57) ABSTRACT

An authentication method, system and a camera for person-identity document comparison are provided. The authentication method for person-identity document comparison includes: acquiring multiple face images; obtaining at least one target face image that meets a preset condition from the multiple face images (S101); receiving an ID image obtained by an ID reading support device (S102); comparing the ID image with each target face image to obtain a person-ID document similarity for each target face image respectively (S103); and, if the number of target face images with person-ID document similarities higher than a preset similarity threshold reaches a first preset number, determining that the authentication is successful (S104). The method achieves high real-time performance of person authentication through the person-ID document comparison.

18 Claims, 4 Drawing Sheets

(56) References Cited

U.S. PATENT DOCUMENTS

| | | |
|---|---|---|
| 2010/0329568 A1 | 12/2010 | Gamliel et al. |
| 2013/0015946 A1 | 1/2013 | Lau et al. |
| 2016/0269401 A1 | 9/2016 | Saito et al. |
| 2016/0275518 A1 * | 9/2016 | Bowles ............... G07F 7/06 |

FOREIGN PATENT DOCUMENTS

| | | | |
|---|---|---|---|
| CN | 103914686 A | | 7/2014 |
| CN | 204155293 U | * | 2/2015 |
| CN | 204155293 U | | 2/2015 |
| CN | 104794386 A | * | 7/2015 |
| CN | 104794386 A | | 7/2015 |
| CN | 104809794 A | | 7/2015 |
| CN | 105243357 A | | 1/2016 |

* cited by examiner

PEOPLE-CREDENTIALS COMPARISON AUTHENTICATION METHOD, SYSTEM AND CAMERA

The present application claims the priority to a Chinese Patent Application No. 201710263608.7, filed with the China National Intellectual Property Administration on Apr. 20, 2017 and entitled "people-credentials comparison authentication method, system and camera", which is incorporated into the present application by reference in its entirety.

TECHNICAL FIELD

The present application relates to the field of image recognition technology, and in particular, to an authentication method, system and a camera for person-identity document comparison.

BACKGROUND

In recent years, with the rapid development of the social economy, and due to the lack of a unified information sharing platform and modern regulatory means, various technologies for manufacturing fake identity cards have emerged, making it more difficult to identify whether a person and a portrait in the identity card are the same person, such as, in the verification of visitors, the verification of travel people etc., which brings great security risks to enterprises and social security. Therefore, it is particularly important to determine the identity of a person by comparing the person with the identity document. The traditional method for person-identity document comparison is to compare the person and the identity card by human eyes. However, it is highly probable to make a wrong judgment with human eyes and it needs to confirm repeatedly, which is extremely inefficient.

For the above problems, in the person-document comparison system in the related art, a camera captures a picture of a person, and sends the captured picture to a computer; a document card reader reads personnel identity information carried in the document, and sends the personnel identity information to the computer; and then the computer performs authentication based on the captured picture and the personnel identity information.

In the above solution, in order to ensure the accuracy of the person-document comparison, it is necessary to capture a high-resolution picture, and then to send the high-resolution picture to the computer. Since the resolution of the picture is higher, the memory occupied by the picture is larger, and the delay of the transmission during the sending process is increased, affecting the efficiency of the person-document comparison, and thereby resulting in a lower real-time performance of person authentication.

SUMMARY

The purpose of the embodiments of the present application is to provide an authentication method, system and a camera for person-identity document comparison, to achieve high real-time performance of person authentication through the person-ID document comparison. The following specific technical solutions are provided.

In a first aspect, an embodiment of the present application provides an authentication method for person-identity document comparison, which is applicable to a camera. The method includes:

acquiring multiple face images;
obtaining at least one target face image that meets a preset condition from the multiple face images,
receiving an ID image obtained by an ID reading support device;
comparing the ID image with each target face image to obtain a person-ID document similarity for each target face image respectively; and
if the number of target face images with person-ID document similarities higher than a preset similarity threshold reaches a first preset number, determining that the authentication is successful.

In a second aspect, an embodiment of the present application provides a camera. The camera includes:

a lens, configured for acquiring multiple face images; and
a processor, configured for obtaining at least one target face image that meets a preset condition from the multiple face images; receiving an ID image obtained by an ID reading support device; comparing the ID image with each target face image to obtain a person-ID document similarity for each target face image respectively; and, if the number of target face images with person-ID document similarities higher than a preset similarity threshold reaches a first preset number, determining that the authentication is successful.

In a third aspect, an embodiment of the present application provides an authentication system for person-identity document comparison. The system includes:

a camera, configured for acquiring multiple face images; obtaining at least one target face image that meets a preset condition from the multiple face images; receiving an ID image obtained by an ID reading support device; comparing the ID image with each target face image to obtain a person-ID document similarity for each target face image respectively; and, if the number of target face images with person-ID document similarities higher than a preset similarity threshold reaches a first preset number, determining that the authentication is successful; and
an ID reading support device, configured for acquiring the ID image and sending the ID image to the camera.

In a fourth aspect, an embodiment of the present application provides a storage medium configured for storing executable code; wherein, the executable code is configured for implementing the authentication method for person-identity document comparison provided by the first aspect of the present application when being executed.

In a fifth aspect, an embodiment of the present application provides an application program configured for implementing the authentication method for person-identity document comparison provided by the first aspect of the present application when being executed.

In the authentication method, system and the camera for person-identity document comparison provided by the embodiments of the present application, the camera compares at least one target face image in the acquired multiple face images with the ID image, to obtain a person-ID document similarity for each target face image, and based on the person-ID document similarity, determines whether the person authentication is successful. The ID image is acquired and then sent by the ID reading support device. The acquisition of the face images and the person-ID document comparison process are independently performed by the camera, thus reducing the delay of the comparison, and thus improving the real-time performance of the person-ID document comparison and the person authentication. Moreover, based on the experience that the ID image is often a front face photo, it is determined whether the person authentication is successful by selecting the target face images, and searching for a target face image with high person-ID document similarity from the target face images, such that the determination result is more accurate. During the comparison, when the number of target face images with person-ID document similarities higher than the preset similarity threshold reaches the first preset number, it is determined that the authentication is successful, and thus the authentication accuracy of the person-ID document comparison is improved.

BRIEF DESCRIPTION OF THE DRAWINGS

In order to more clearly describe the technical solutions of the embodiments of the present application and the prior art, accompanying drawings that need to be used in embodiments and the prior art will be briefly described below. Obviously, accompanying drawings described below are for only some of embodiments of the present application; those skilled in the art may also obtain other accompanying drawings based on these accompanying drawings without any creative efforts.

DETAILED DESCRIPTION

In order to make the objective, technical solutions, and advantages of the present application clearer and more understandable, the present application will be described in more detail below with reference to the accompanying drawings and embodiments. Obviously, the described embodiments are only some, and not all, of the embodiments of the present application. All other embodiments obtained based on the embodiments of the present application by those skilled in the art without any creative efforts fall into the scope of protection of the present application.

In order to achieve the high real-time performance of person authentication, an embodiment of the present application provides an authentication method and system for person-identity document comparison and a camera.

The authentication method for person-identity document comparison provided by an embodiment of the present application is firstly introduced below.

It should be noted that the authentication method for person-identity document comparison provided by the embodiment of the present application may be performed by a camera which is configured for acquiring a face image, and may be a device having a shooting function, such as, a video camera, a still camera, a mobile phone, or the like. The camera may include a processing chip with processing capability for performing the person-document comparison. The processing chip may be a core processing chip such as, a DSP (Digital Signal Processor), an ARM (Advanced Reduced Instruction Set Computer Machines) or an FPGA (Field-Programmable Gate Array). The authentication method for person-identity document comparison provided by the embodiment of the present application may be implemented by at least one of a software circuit, a hardware circuit and a logic circuit disposed in the executive body.

Figure 1:
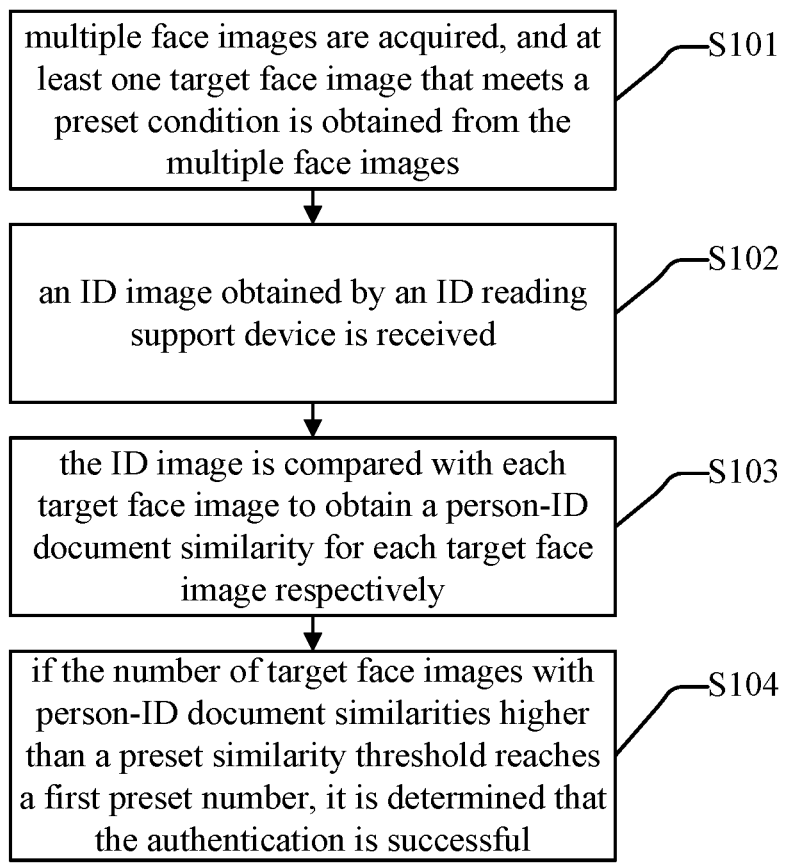
FIG. 1 is a schematic flowchart of an authentication method for person-identity document comparison according to an embodiment of the present application.

As shown in FIG. 1, the authentication method for person-identity document comparison provided by an embodiment of the present application may include the following steps.

At S101, multiple face images are acquired, and at least one target face image that meets a preset condition is obtained from the multiple face images.

This embodiment is applicable to scenes such as an access control, a security check. In these scenes, a camera is usually installed at a specified location. Since the camera may be fixed or rotated, the camera may capture images within a fixed area or a moving area in real time, and then determine face images in all the images by a face recognition technology. The camera may also capture a face image within the fixed area or the moving area after detecting the portrait information in the capture area. These situations are all within the scope of protection of the embodiments of the present application. In order to ensure the effect of the person-document comparison, the camera may be set to be fixed and not rotated. Since it is necessary to compare the person with an ID image, if only one face image is acquired and it is impossible to accurately determine whether the face image matches the ID image due to the face image is not clear, etc., the determination result will be seriously affected. Therefore, in order to ensure the accuracy of the determination result, in the present embodiment, the camera acquires multiple face images, and compares each of the face images with the ID image one by one. In this way, there may be multiple face images with a higher degree of similarity, and thus whether the face images match with the ID image can be determined comprehensively.

Since the camera may be either a still camera or a video camera, the camera may capture either pictures or videos. If the camera captures pictures, multiple face images are determined from the captured pictures. If the camera captures videos, multiple frames having face information are determined from the captured videos as the face images.

Optionally, the step of acquiring multiple face images may include the following steps.

In a first step, a region of interest for acquiring a face is determined based on a preset installation position and a preset capture range.

The preset installation position is an installation position that meets a preset height range and a preset depression angle range. The installation position of the camera determines the capture range and directly affects the image analysis process. The installation position of the camera is related to the installation height and depression angle. For example, if the installation height of the camera is set to 3 m and the depression angle is set to 45°, the capture range of the camera is within a certain range beyond 3 m from the vertical position of the camera. The certain range mentioned here may be obtained by adjusting the parameters, such as, the focal length and aperture of the camera, etc., to make the captured face images have higher definition. Due to this embodiment is mainly applicable to scenes such as an access control, a security check, etc., the height of a door is usually about 3 m, and the height of a person usually does not exceed 2 m, the preset height range is usually set to 2 m to 4 m. In view of safety, and in order to improve the speed and effect of the subsequent comparison process between a person and an ID document, it is often necessary to make the capture area farther from the camera, and the size of the acquired face image is similar to the size of an ID photo. Therefore, the preset depression angle range is usually set to 20° to 45°. In addition to the installation angle of the camera, since there may be multiple persons in the field of view of the camera, the camera is not able to determine the face to be compared, and thus it is necessary to ensure that there is only a single face in the camera's field of view. Therefore, it is possible to ensure that there is only a single face in the field of view of the camera by an ROI (Region of Interest) detection function. For example, the camera supports the face detection for the region of interest, and only captures a face inside the region of interest, avoiding persons behind to enter the field of view. The region of interest is related to the preset capture range. In general, the preset capture range may be selected to be in the middle of the field of view of the camera, which occupies ½ of the full screen. Of course, it is also possible that the preset capture range occupies ⅓ or ¼ of the full screen. The smaller the ratio is, the smaller the chance of multiple persons appearing in the region of interest is. However, if the ratio is set too small, there may be cases where a complete face cannot be detected.

In a second step, images in the region of interest are continuously acquired, and face images in all the images are determined by a face recognition technology.

The camera may capture a video, and determines multiple frames having face features from the region of interest of all frames of the video as the face images by the face recognition technology. The camera may also capture multiple pictures in succession, and determine multiple face images with face features in the region of interest of all pictures by the face recognition technology. The face recognition technology may be any one of existing face recognition technologies, for example, convolutional neural network technology, deep learning technology, etc., which all belong to the scope of the protection of the embodiment of the present application, and will not be further described.

There may be front face images, side face images, or images in which the face is severely obscured in the acquired multiple face images. In these images, due to, for example, the images in which the face is severely obscured or back face images have little effect on the comparison between a person and an ID document, the acquired multiple face images may be firstly screened to select at least one target face image that meets the preset condition. The preset condition may be front face, non-obscuration, clarity, or the like.

Optionally, obtaining at least one target face image that meets a preset condition from the multiple face images, may include:

based on a preset face scoring strategy, obtaining at least one target face image with a score higher than a preset score threshold from the multiple face images;

or, based on the preset face scoring strategy, obtaining target face images that meet a second preset number from the multiple face images according to a descending order of the score.

The face scoring strategy refers to a strategy for determining whether the quality of a captured face image is high or low based on rules such as the face angle, the obscuration, etc. The performance of the face scoring strategy directly affect the selection of the captured face images, and indirectly affect the result of the comparison between a person and an ID document. If the selection of the captured face images is not suitable, such as, selection of face images with a relatively large angle or of face images in which the face is obscured, the similarity between the person and the ID document will be seriously affected. Therefore, it is generally possible to use factors, such as, front face, non-obscuration, clarity, or the like as the preset face scoring strategy, that is, a face image in which the face is front, not obscured and clear will have a higher score. In order to improve the accuracy of the comparison, a preset score threshold may be set, for example 95. All of face images with scores greater than the preset score threshold are selected as the target face images; or a second preset number is set, for example 10, and starting from the face image with the maximum score, 10 face images are selected as the target face images according to a descending order of the score.

At S102, an ID image obtained by an ID reading support device is received.

The ID reading support device is configured for obtaining an ID image. The ID reading support device may be a second-generation identity card reader, a work permit card reader, etc. The ID image refers to the identification photo in the ID document or the identification photo corresponding to the ID information. The ID reading support device obtaining the ID image may be: directly capturing the certificate image on the ID document, or extracting the certificate image corresponding to the certificate information from an information base by reading the certificate information. The above all belong to the scope of the protection of the embodiment of the present application, and are not specifically limited herein. Optionally, the ID reading support device may be directly connected to the camera via a transmission network, and the ID reading support device may also be connected to a client for display and then be connected to the camera via the client. The transmission network may be a wired network or a wireless network. The specific connection form of the wired network is not limited, which may be a USB connection, a serial connection, etc. The client here has only a display function and does not have a control function.

S103: the ID image is compared with each target face image to obtain a person-ID document similarity for each target face image, respectively.

After receiving the ID image, the camera compares the ID image with each target face image one by one to compare the feature value or feature information of feature points of the image, for example, feature points having face features, such as eyes, the nose, the mouth, and the facial form. The comparison results may be scored based on a hundred-mark system or percentage to represent the similarities of the target face images. The higher the score of a target face image is, the closer the target face image is to the ID image. The specific comparison process may be performed by using, such as, a similarity calculation of feature points. Of course, other manners being able to achieve the image comparison are also included in the scope of the protection of the embodiment of the present application, which are not described in detail.

Optionally, comparing the ID image with each target face image to obtain a person-ID document similarity for each target face image respectively, may include:

in a first step, extracting face features from the ID image and each target face image to obtain face features of the ID image and face features of each target face image; and in a second step, matching the face features of the ID image with the face features of each target face image one by one, to obtain a person-ID document similarity for each target face image.

Since the identification photo is usually a front face picture, the more the frontal information in the face image is, the higher the similarity between the face image and the ID image is. Therefore, the face features are extracted from the target face images, and the ID image is compared and matched with each target face image one by one based on the face features, to obtain the person-ID document similarity for each target face image.

At S104, if the number of target face images with person-ID document similarities higher than a preset similarity threshold reaches a first preset number, it is determined that the authentication is successful.

The first preset number may be at least one. If the preset similarity threshold is set very high, for example, set to 95%, as long as there is one target face image with person-ID document similarity higher than 95%, it can be determined that the person authentication is successfully. However, if the preset similarity threshold is set relatively low, for example, set to 85%, in order to avoid the influence of the false detection on the results, the preset number may be set to multiple. Then, if there are multiple (for example 5) target face images with person-ID document similarities greater than 85%, it can be determined that the person authentication is successfully. After the person authentication is successful, the camera may send an authentication success indication to the user, or directly control the security device, such as, a gate machine, to be opened.

Optionally, the step of determining that the authentication is successful, may include:

comparing a person-ID document similarity for each target face image with the preset similarity threshold in sequence, to obtain the number of target face images with person-ID document similarities greater than the preset similarity threshold by statistics; and if the number of target face images with person-ID document similarities greater than the preset similarity threshold reaches the first preset number, determining that the authentication is successful.

The first preset number may be at least one. If the preset similarity threshold is set very high, for example, set to 95%, as long as there is one target face image with person-ID document similarity higher than 95%, it can be determined that the person authentication is successfully. However, if the preset similarity threshold is set relatively low, for example, set to 85%, in order to avoid the influence of the false detection on the results, the preset number may be set to multiple. Then, if there are multiple (for example 5) target face images with person-ID document similarities greater than 85%, it can be determined that the person authentication is successful.

By applying this embodiment, the camera compares at least one target face image in the acquired multiple face images with the ID image, to obtain a person-ID document similarity for each target face image, and based on the person-ID document similarity, determines whether the person authentication is successful. The ID image is acquired and then sent by the ID reading support device. The acquisition of the face images and the person-ID document comparison process are independently performed by the camera, thus reducing the delay of the comparison, and thus improving the real-time performance of the person-ID document comparison and the person authentication. Moreover, based on the experience that the ID image is often a front face photo, it is determined whether the person authentication is successful by selecting target face images, and searching for a target face image with high person-ID document similarity from the target face images, such that the determination result is more accurate. During the comparison, when in all the target face images, the number of target face images having person-ID document similarities higher than the preset similarity threshold reaches the first preset number, it is determined that the authentication is successful, and thus the authentication accuracy of the person-ID document comparison is improved.

Figure 2:
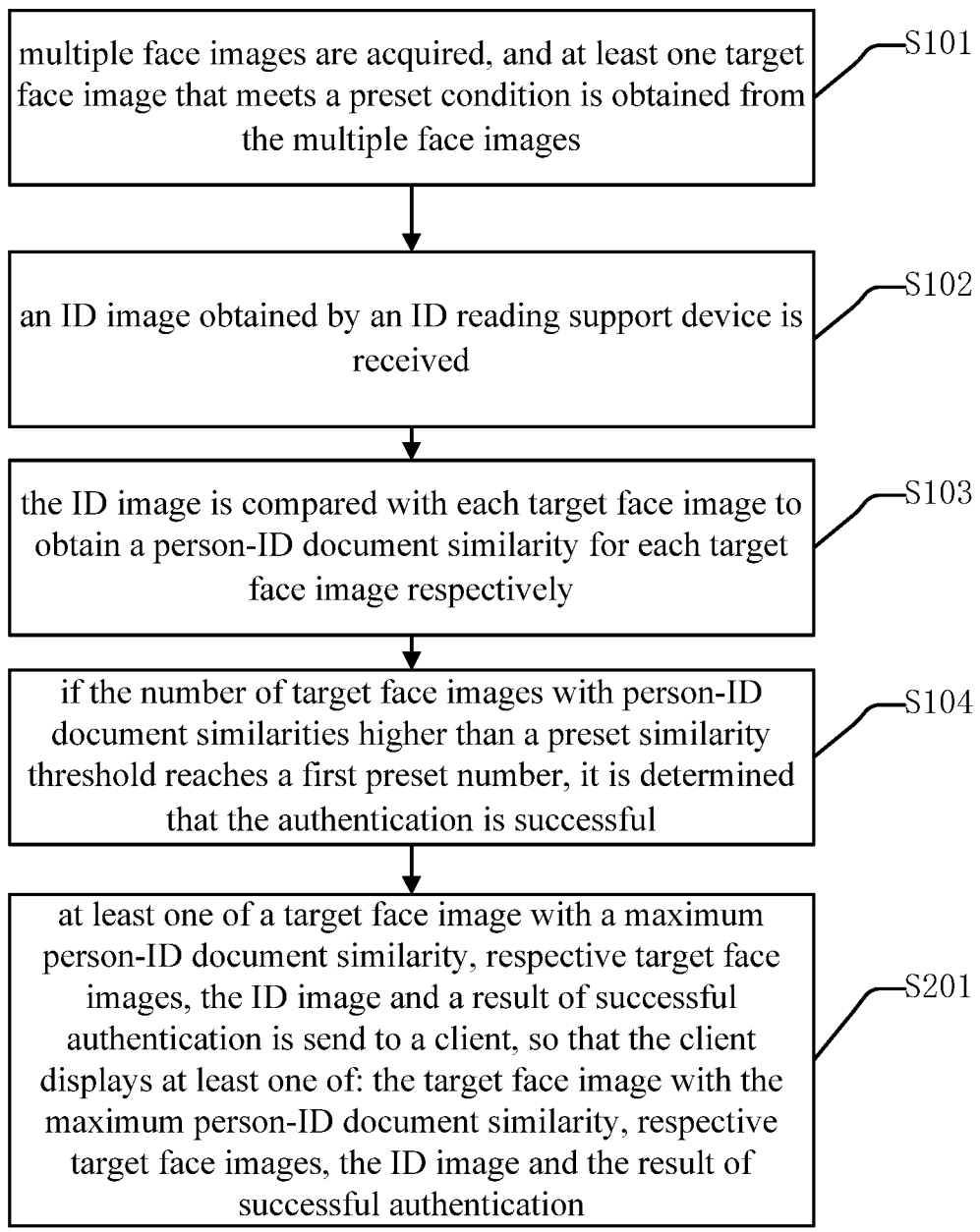
FIG. 2 is a schematic flowchart of an authentication method for person-identity document comparison according to another embodiment of the present application.

Based on the embodiment shown in FIG. 1, as shown in FIG. 2, an embodiment of the present application further provides an authentication method for person-identity document comparison. After S104, the method may include the following step.

At S201, at least one of a target face image with a maximum person-ID document similarity, respective target face images, the ID image and a result of successful authentication is send to a client, so that the client displays at least one of:

the target face image with the maximum person-ID document similarity, respective target face images, the ID image and the result of successful authentication.

Since the detection result of the camera may be wrong, in order to improve the accuracy of control, after the camera determines the detection result and the authentication result, the camera sends the detection result and the authentication result to the client, and the client may display the detection result, such as, the target face image with the maximum person-ID document similarity, respective target face images, the ID image and the result of successful authentication, on the display screen, for the user to make a second determination. In this way, the user may determine whether the result of the successful authentication is correct and whether the operation, such as, opening the gate, etc., may be performed for the person by observing the display on the client. The client is a client that includes at least a display device.

In this embodiment, steps other than S201 shown may be performed with reference to S101 to S104 of the embodiment shown in FIG. 1, which will not be described herein again.

By applying this embodiment, the camera compares at least one target face image in the acquired multiple face images with the ID image, to obtain the person-ID document similarity for each target face image, and based on the person-ID document similarity, determines whether the person authentication is successful. The ID image is acquired and then sent by the ID reading support device. The acquisition of the face images and the person-ID document comparison process are independently performed by the camera, thus reducing the delay of the comparison, and thus improving the real-time performance of the person-ID document comparison and the person authentication. Moreover, based on the experience that the ID image is often a front face photo, it is determined whether the person authentication is successful by selecting target face images, and searching for a target face image with high person-ID document similarity from the target face images, such that the determination result is more accurate. During the comparison, when in all the target face images, the number of target face images having person-ID document similarities higher than the preset similarity threshold reaches the first preset number, it is determined that the authentication is successful, and thus the authentication accuracy of the person-ID document comparison is improved. Moreover, by using the client to display the detection result and the authentication result, the human-computer interaction is achieved, and when the determination result of successful authentication made by the machine is wrong, the user can also make a second determination, thereby ensuring high accuracy of the person authentication.

Figure 3:
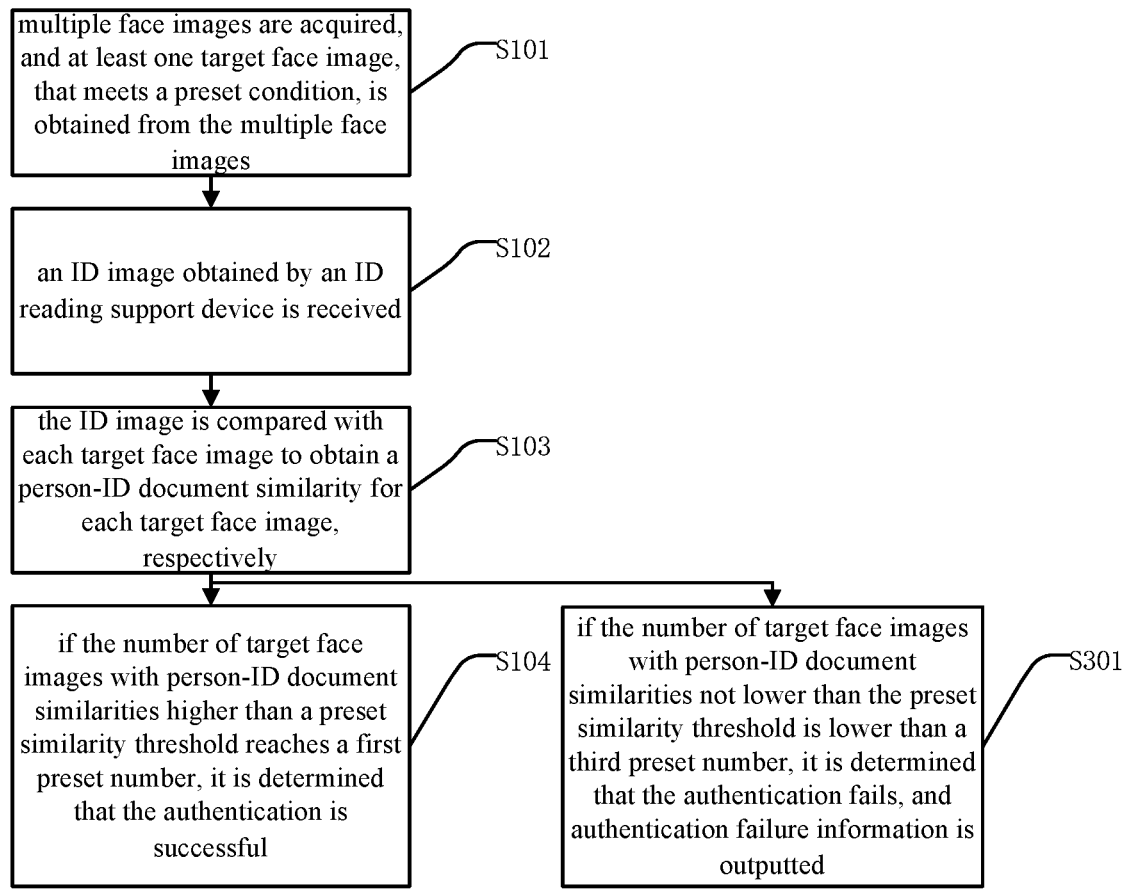
FIG. 3 is a schematic flowchart of an authentication method for person-identity document comparison according to a further embodiment of the present application.

Based on the embodiment shown in FIG. 1, as shown in FIG. 3, an embodiment of the present application further provides an authentication method for person-identity document comparison. After S103, the method may include the following step.

At S301, if the number of target face images with person-ID document similarities not lower than the preset similarity threshold is lower than a third preset number, it is determined that the authentication fails, and authentication failure information is outputted.

The third preset number may be equal to the first preset number, or may be smaller than the first preset number. When the third preset number is one, if in all the target face images, there is no target face image having a person-ID document similarity greater than or equal to the preset similarity threshold, the person authentication fails. When the third preset number is multiple, if in all the target face images, the number of target face images having person-ID document similarities greater than or equal to the preset similarity threshold does not reach the third preset number, the person authentication fails. After the camera determines that the person authentication fails, the camera may output authentication failure information. The authentication failure information may be alarm information, display information, or the like, for prompting the client that the person authentication is failed.

Optionally, the step of outputting authentication failure information may include:

sending at least one of a target face image with a maximum person-ID document similarity, each target face image, the ID image, and a result of authentication failure to a client, so that the client displays at least one of:

the target face image with the maximum person-ID document similarity, each target face image, the ID image and the result of authentication failure.

The client may display the detection result, such as, the target face image with the maximum person-ID document similarity, each target face image, the ID image, and the result of authentication failure, on the display screen, for the user to make a second determination. In this way, the user may determine whether the result of the authentication failure is correct by observing the display on the client.

In this embodiment, steps other than S301 shown may be performed with reference to S101 to S104 of the embodiment shown in FIG. 1, which will not be described herein again.

By applying this embodiment, the camera compares at least one target face image in the acquired multiple face images with the ID image, to obtain the person-ID document similarity for each target face image, and based on the person-ID document similarity, determines whether the person authentication is successful. The ID image is acquired and then sent by the ID reading support device. The acquisition of the face images and the person-ID document comparison process are independently performed by the camera, thus reducing the delay of the comparison, and thus improving the real-time performance of the person-ID document comparison and the person authentication. Moreover, based on the experience that the ID image is often a front face photo, it is determined whether the person authentication is successful by selecting the target face images, and searching for a target face image with high person-ID document similarity from the target face images, such that the determination result is more accurate. During the comparison, when in all the target face images, the number of target face images with person-ID document similarities higher than the preset similarity threshold reaches the first preset number, it is determined that the authentication is successful, and thus the authentication accuracy of the person-ID document comparison is improved. Moreover, by using the client to display the detection result and the authentication result, the human-computer interaction is achieved, and when the determination result of authentication failure made by the machine is wrong, the user can also make a second determination, thereby ensuring high accuracy of the person authentication.

It should be noted that the embodiment of the present application further provides an authentication method for comparing a person with an ID document, which may include all of the steps of the embodiments shown in FIG. 2 and FIG. 3, wherein, S101 to S104 and S201 may be implemented with reference to the embodiment shown in FIG. 2, and S301 may be implemented with reference to the embodiment shown in FIG. 3, which will be not described herein again.

The authentication method for person-identity document comparison provided by the embodiments of the present application is introduced below with reference to a specific application example.

Figure 4:
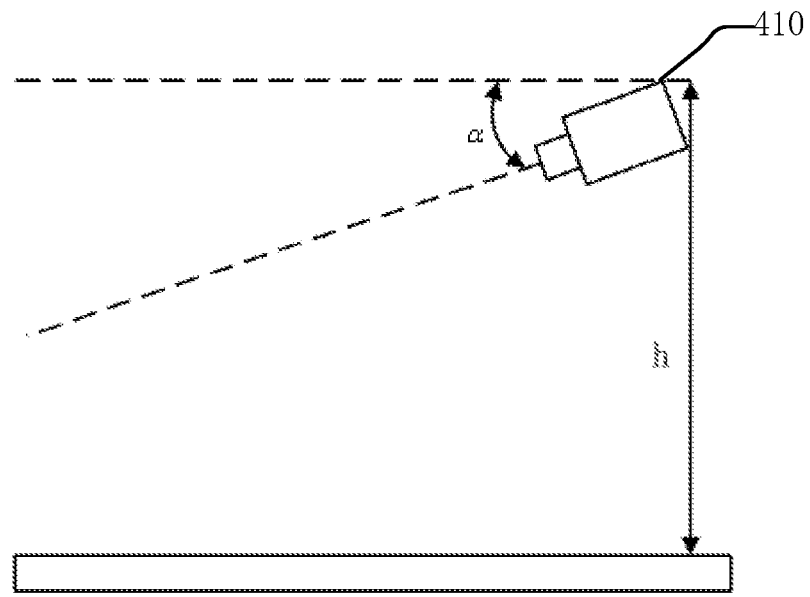
FIG. 4 is a side view of installation of the camera in an example of the authentication method for person-identity document comparison according to an embodiment of the present application.

FIG. 4 is a side view of installation of the camera in the application example of the present application. The installation height h of the camera 410 is set to 3 m, the depression angle α of the camera is set to 30°, and the camera is selected to be unable to rotate.

It is assumed that the embodiment is applied to a scene where people clock in to enter the office area, and the region of interest is set within the field of view of the camera, in the middle of the field of view, and to occupy ½ of the total field of view. A work permit of an employee is scanned by the work permit reader. The work permit reader obtains the corresponding ID image. The employee stands in a capture area and is captured by the camera. The camera acquires multiple face images, and obtains 8 target face images with scores higher than 95 by the preset face scoring strategy. The camera compares each target face image with the ID image one by one to obtain a person-ID document similarity of each target face image, and sets a similarity threshold to 90%. If in all the target face images, there are 5 target face images with person-ID document similarities higher than the preset similarity threshold, which equal to the first preset number 5, it is determined that the employee is successfully authenticated, that is, the employee clocks in successfully.

Compared with related art, in this solution, the camera compares at least one target face image in the acquired multiple face images with the ID image, to obtain a person-ID document similarity for each target face image, and based on the person-ID document similarity, determines whether the person authentication is successful. The ID image is acquired and then sent by the ID reading support device. The acquisition of the face images and the person-ID document comparison process are independently performed by the camera, thus reducing the delay of the comparison, and thus improving the real-time performance of the person-ID document comparison and the person authentication. Moreover, based on the experience that the ID image is often a front face photo, it is determined whether the person authentication is successful by selecting the target face images, and searching for a target face image with high person-ID document similarity from the target face images, such that the determination result is more accurate. During the comparison, when in all the target face images, the number of target face images with person-ID document similarities higher than the preset similarity threshold reaches the first preset number, it is determined that the authentication is successful, and thus the authentication accuracy of the person-ID document comparison is improved.

Figure 5:
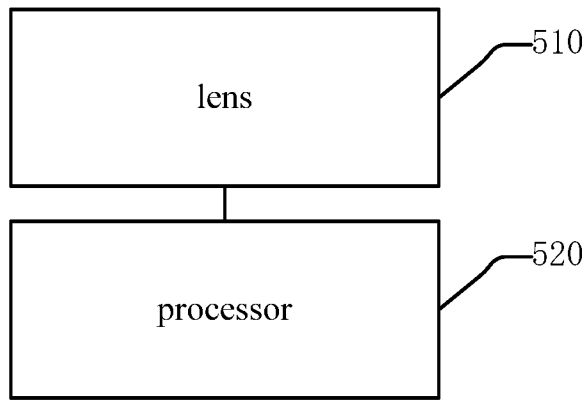
FIG. 5 is a schematic structural diagram of a camera according to an embodiment of the present application.

Corresponding to the above embodiment, an embodiment of the present application further provides a camera. As shown in FIG. 5, the camera may include:

a lens 510, configured for acquiring multiple face images; and a processor 520, configured for obtaining at least one target face image that meets a preset condition from the multiple face images; receiving an ID image obtained by an ID reading support device; comparing the ID image with each target face image to obtain a person-ID document similarity for each target face image respectively; and, if the number of target face images with person-ID document similarities higher than a preset similarity threshold reaches a first preset number, determining that the authentication is successful.

By applying this embodiment, the camera compares at least one target face image in the acquired multiple face images with the ID image, to obtain a person-ID document similarity for each target face image, and based on the person-ID document similarity, determines whether the person authentication is successful. The ID image is acquired and then sent by the ID reading support device. The acquisition of the face images and the person-ID document comparison process are independently performed by the camera, thus reducing the delay of the comparison, and thus improving the real-time performance of the person-ID document comparison and the person authentication. Moreover, based on the experience that the ID image is often a front face photo, it is determined whether the person authentication is successful by selecting the target face images, and searching for a target face image with high person-ID document similarity from the target face images, such that the determination result is more accurate. During the comparison, when in all the target face images, the number of target face images with person-ID document similarities higher than the preset similarity threshold reaches the first preset number, it is determined that the authentication is successful, and thus the authentication accuracy of the person-ID document comparison is improved.

Optionally, the lens 510 may specifically be configured for:

determining a region of interest for acquiring a face based on a preset installation position and a preset capture range; wherein, the preset installation position is an installation position that meets a preset height range and a preset depression angle range; and continuously acquiring images in the region of interest, and determining face images in all images by a face recognition technology.

Optionally, the processor 520 may specifically be configured for:

based on a preset face scoring strategy, obtaining at least one target face image with a score higher than a preset score threshold from the multiple face images;

or, based on the preset face scoring strategy, obtaining target face images that meet a second preset number from the multiple face images according to a descending order of the score.

Optionally, the processor 520 may further specifically be configured for:

sending at least one of a target face image with a maximum person-ID document similarity, respective target face images, the ID image and a result of successful authentication to a client, so that the client displays at least one of:

the target face image with the maximum person-ID document similarity, respective target face images, the ID image and the result of successful authentication.

Optionally, the processor 520 may further specifically be configured for:

extracting face features from the ID image and each target face image to obtain face features of the ID image and face features of each target face image; and matching the face features of the ID image with the face features of each target face image one by one, to obtain a person-ID document similarity for each target face image.

Optionally, the processor 520 may further specifically be configured for:

comparing a person-ID document similarity for each target face image with the preset similarity threshold in sequence, to obtain the number of target face images with person-ID document similarities greater than the preset similarity threshold by statistics; and if the number of target face images with person-ID document similarities greater than the preset similarity threshold reaches the first preset number, determining that the authentication is successful.

Optionally, the processor 520 may further specifically be configured for:

if the number of target face images with person-ID document similarities not lower than the preset similarity threshold is lower than a third preset number, determining that the authentication fails, and outputting authentication failure information.

Optionally, the processor 520 is further specifically configured for:

sending at least one of a target face image with a maximum person-ID document similarity, respective target face images, the ID image and a result of authentication failure to a client, so that the client displays at least one of:

the target face image with the maximum person-ID document similarity, each target face image, the ID image and the result of authentication failure.

It should be noted that the camera in the embodiment of the present application is a camera performing the above authentication method for comparing a person with an ID document, and all of embodiments of the above authentication method for comparing a person with an ID document are applicable to the camera, which can achieve the same or similar beneficial effects.

Figure 6:
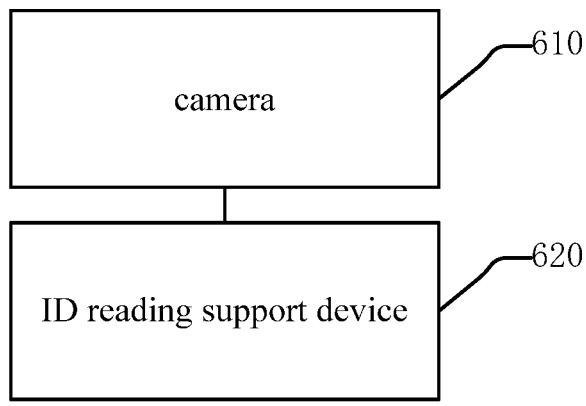
FIG. 6 is a schematic structural diagram of an authentication system for person-identity document comparison according to an embodiment of the present application.

Corresponding to the above embodiment, an embodiment of the present application provides an authentication system for person-identity document comparison. As shown in FIG. 6, the authentication system for person-identity document comparison may include:

a camera 610, configured for acquiring multiple face images; obtaining at least one target face image that meets a preset condition from the multiple face images; receiving an ID image obtained by an ID reading support device; comparing the ID image with each target face image to obtain a person-ID document similarity for each target face image respectively; and, if the number of target face images with person-ID document similarities higher than a preset similarity threshold reaches a first preset number, determining that the authentication is successful; and an ID reading support device 620, configured for acquiring the ID image and sending the ID image to the camera.

By applying this embodiment, the camera compares at least one target face image in the acquired multiple face images with the ID image, to obtain a person-ID document similarity for each target face image, and based on the person-ID document similarity, determines whether the person authentication is successful. The ID image is acquired and then sent by the ID reading support device. The acquisition of the face images and the person-ID document comparison process are independently performed by the camera, thus reducing the delay of the comparison, and thus improving the real-time performance of the person-ID document comparison and the person authentication. Moreover, based on the experience that the ID image is often a front face photo, it is determined whether the person authentication is successful by selecting the target face images, and searching for a target face image with high person-ID document similarity from the target face images, such that the determination result is more accurate. During the comparison, when in all the target face images, the number of target face images with person-ID document similarities higher than the preset similarity threshold reaches the first preset number, it is determined that the authentication is successful, and thus the authentication accuracy of the person-ID document comparison is improved.

Optionally, the camera 610 is connected to the ID reading support device 620 via a connection port.

Optionally, the camera 610 may specifically be configured for:

determining a region of interest for acquiring a face based on a preset installation position and a preset capture range; wherein, the preset installation position is an installation position that meets a preset height range and a preset depression angle range; and continuously acquiring images in the region of interest, and determining face images in all images by a face recognition technology.

Optionally, the camera 610 may further specifically be configured for:

based on a preset face scoring strategy, obtaining at least one target face image with a score higher than a preset score threshold from the multiple face images;

or, based on the preset face scoring strategy, obtaining target face images that meet a second preset number from the multiple face images according to a descending order of the score.

Optionally, the camera 610 may further specifically be configured for:

extracting face features from the ID image and each target face image to obtain face features of the ID image and face features of each target face image; and matching the face features of the ID image with the face features of each target face image one by one, to obtain a person-ID document similarity for each target face image.

Optionally, the camera 610 may further specifically be configured for:

comparing a person-ID document similarity for each target face image with the preset similarity threshold in sequence, to obtain the number of target face images with person-ID document similarities greater than the preset similarity threshold by statistics; and if the number of target face images with person-ID document similarities greater than the preset similarity threshold reaches the first preset number, determining that the authentication is successful.

Optionally, the camera 610 may further specifically be configured for:

if the number of target face images with person-ID document similarities not lower than the preset similarity threshold is lower than a third preset number, determining that the authentication fails, and outputting authentication failure information.

Optionally, the ID reading support device 620 may further specifically be configured for:

acquiring ID information, and reading a face image corresponding to the ID information from an information base as the ID image;

or, capturing and extracting a face image from the ID document as the ID image.

It should be noted that the authentication system for person-identity document comparison in the embodiment of the present application is a system applying the above authentication method for comparing a person with an ID document and the above camera, and all of embodiments of the above authentication method for comparing a person with an ID document and of the camera are applicable to the system, which can achieve the same or similar beneficial effects.

Figure 7:
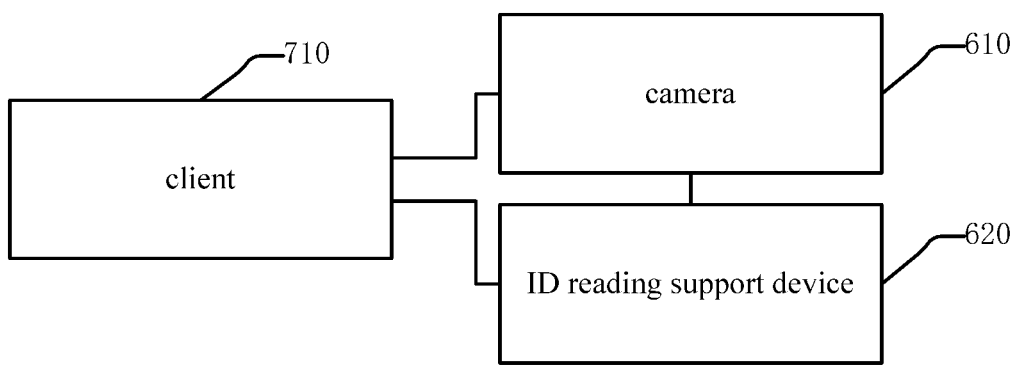
FIG. 7 is a schematic structural diagram of an authentication system for person-identity document comparison according to another embodiment of the present application.

Further, on the basis of including the camera 610 and the ID reading support device 620, as shown in FIG. 7, the authentication system for person-identity document comparison provided by the embodiment of the present application may further include:

a client 710, configured for receiving and displaying at least one of: the face images and a result of the authentication sent by the camera 610, and the ID image sent by the ID reading support device 620.

By applying this embodiment, the camera compares at least one target face image in the acquired multiple face images with the ID image, to obtain a person-ID document similarity for each target face image, and based on the person-ID document similarity, determines whether the person authentication is successful. The ID image is acquired and then sent by the ID reading support device. The acquisition of the face images and the person-ID document comparison process are independently performed by the camera, thus reducing the delay of the comparison, and thus improving the real-time performance of the person-ID document comparison and the person authentication. Moreover, based on the experience that the ID image is often a front face photo, it is determined whether the person authentication is successful by selecting the target face images, and searching for a target face image with high person-ID document similarity from the target face images, such that the determination result is more accurate. During the comparison, when in all the target face images, the number of target face images with person-ID document similarities higher than the preset similarity threshold reaches the first preset number, it is determined that the authentication is successful, and thus the authentication accuracy of the person-ID document comparison is improved. Moreover, by using the client to display the detection result and the authentication result, the human-computer interaction is achieved, and when the determination made by the machine is wrong, the user can also make a second determination, thereby ensuring high accuracy of the person authentication.

Optionally, the camera 610 may further specifically be configured for:

sending at least one of a target face image with a maximum person-ID document similarity, respective target face images, the ID image and a result of successful authentication to a client 710;

the client 710 may further specifically be configured for:

displaying at least one of: the target face image with the maximum person-ID document similarity, respective target face images, the ID image and the result of successful authentication.

Optionally, the camera 610 may further specifically be configured for:

sending at least one of a target face image with a maximum person-ID document similarity, respective target face images, the ID image and a result of authentication failure to a client 710;

the client 710 may further specifically be configured for:

displaying at least one of: the target face image with the maximum person-ID document similarity, each target face image, the ID image and the result of authentication failure.

Optionally, the camera 610 sends the target face image and the result of the authentication to the client 710 via a USB network adapter card; and the ID reading support device 620 sends the ID image to the client 710 via the USB network adapter card.

It should be noted that the authentication system for person-identity document comparison in the embodiment of the present application is a system applying the above authentication method for comparing a person with an ID document and the above camera, and all of embodiments of the above authentication method for comparing a person with an ID document and of the camera are applicable to the system, which can achieve the same or similar beneficial effects.

In addition, corresponding to the authentication method for person-identity document comparison provided by the above embodiment, an embodiment of the present application provides a storage medium for storing executable code. The executable code is configured for, when being executed, implementing the authentication method for person-identity document comparison provided by the embodiment of the present application. Specifically, the authentication method for person-identity document comparison includes:

acquiring multiple face images;

obtaining at least one target face image that meets a preset condition from the multiple face images, receiving an ID image obtained by an ID reading support device;

comparing the ID image with each target face image to obtain a person-ID document similarity for each target face image respectively; and if the number of target face images with person-ID document similarities higher than a preset similarity threshold reaches a first preset number, determining that the authentication is successful.

In this embodiment, the storage medium stores executable code configured for, when being executed, implementing the authentication method for person-identity document comparison provided by the embodiment of the present application, such that the acquisition of the face images and the person-ID document comparison process are independently performed by the camera, thus reducing the delay of the comparison, and thus improving the real-time performance of the person-ID document comparison and the person authentication. Moreover, based on the experience that the ID image is often a front face photo, it is determined whether the person authentication is successful by selecting the target face images, and searching for a target face image with high person-ID document similarity from the target face images, such that the determination result is more accurate. During the comparison, when the number of target face images with person-ID document similarities higher than the preset similarity threshold reaches the first preset number, it is determined that the authentication is successful, and thus the authentication accuracy of the person-ID document comparison is improved.

In addition, corresponding to the authentication method for person-identity document comparison provided by the above embodiment, an embodiment of the present application provides an application program. The application program is configured for, when being executed, implementing the authentication method for person-identity document comparison provided by the embodiment of the present application. Specifically, the authentication method for person-identity document comparison provided by the embodiment of the present application, includes:

acquiring multiple face images;

obtaining at least one target face image that meets a preset condition from the multiple face images, receiving an ID image obtained by an ID reading support device;

comparing the ID image with each target face image to obtain a person-ID document similarity for each target face image respectively; and if the number of target face images with person-ID document similarities higher than a preset similarity threshold reaches a first preset number, determining that the authentication is successful.

In this embodiment, the application program is configured for, when being executed, implementing the authentication method for person-identity document comparison provided by the embodiment of the present application, such that the acquisition of the face images and the person-ID document comparison process are independently performed by the camera, thus reducing the delay of the comparison, and thus improving the real-time performance of the person-ID document comparison and the person authentication. Moreover, based on the experience that the ID image is often a front face photo, it is determined whether the person authentication is successful by selecting the target face images, and searching for a target face image with high person-ID document similarity from the target face images, such that the determination result is more accurate. During the comparison, when the number of target face images with person-ID document similarities higher than the preset similarity threshold reaches the first preset number, it is determined that the authentication is successful, and thus the authentication accuracy of the person-ID document comparison is improved.

The embodiments of the application program and the storage medium are described briefly, since the method contents involved thereof are substantially similar to the foregoing embodiments of the method, and the related contents can refer to the description of the embodiments of the method.

It should be noted that the relationship terms used herein, such as "first", "second" and the like are only to distinguish one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the system is described briefly, since it is substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. An authentication method for person-identity document comparison, which is applicable to a camera, comprising:
   acquiring multiple face images of a face;
   obtaining at least one target face image that meets a preset condition from the multiple face images,
   receiving an ID image obtained by an ID reading support device;
   comparing the ID image with each target face image to obtain a person-ID document similarity for each target face image respectively; and
   if the number of target face images with person-ID document similarities higher than a preset similarity threshold reaches a first preset number, determining that the authentication is successful;
   wherein, obtaining at least one target face image that meets a preset condition from the multiple face images comprises:
   based on a preset face scoring strategy, obtaining at least one target face image with a score higher than a preset score threshold from the multiple face images, wherein the preset face scoring strategy comprises factors containing at least one of front face, non-obscuration and clarity;
   or,
   based on the preset face scoring strategy, obtaining target face images that meet a second preset number from the multiple face images according to a descending order of the score.

2. The method of claim 1, wherein, acquiring multiple face images comprises:
   determining a region of interest for acquiring a face based on a preset installation position of the camera and a preset capture range; wherein, the preset installation position is an installation position that meets a preset height range and a preset depression angle range; and
   continuously acquiring images in the region of interest, and determining face images in all images by a face recognition technology.

3. The method of claim 1, wherein, after determining that the authentication is successful if the number of target face images with person-ID document similarities higher than the preset similarity threshold reaches the first preset number, the method further comprises:
   sending at least one of a target face image with a maximum person-ID document similarity, respective target face images, the ID image and a result of successful authentication to a client, so that the client displays at least one of:
   the target face image with the maximum person-ID document similarity, respective target face images, the ID image and the result of successful authentication.

4. The method of claim 1, wherein, comparing the ID image with each target face image to obtain a person-ID document similarity for each target face image respectively comprises:
   extracting face features from the ID image and each target face image to obtain face features of the ID image and face features of each target face image; and
   matching the face features of the ID image with the face features of each target face image one by one, to obtain a person-ID document similarity for each target face image.

5. The method of claim 1, wherein, if the number of target face images with person-ID document similarities higher than the preset similarity threshold reaches the first preset number, determining that the authentication is successful, comprises:
   comparing a person-ID document similarity for each target face image with the preset similarity threshold in sequence, to obtain the number of target face images with person-ID document similarities greater than the preset similarity threshold by statistics; and
   if the number of target face images with person-ID document similarities greater than the preset similarity threshold reaches the first preset number, determining that the authentication is successful.

6. The method of claim 1, wherein, after comparing the ID image with each target face image to obtain a person-ID document similarity for each target face image respectively, the method further comprises:
   if the number of target face images with person-ID document similarities not lower than the preset similarity threshold is lower than a third preset number, determining that the authentication fails, and outputting authentication failure information.

7. The method of claim 6, wherein, outputting authentication failure information comprises:
   sending at least one of a target face image with a maximum person-ID document similarity, respective target face images, the ID image and a result of authentication failure to a client, so that the client displays at least one of:
   the target face image with the maximum person-ID document similarity, each target face image, the ID image and the result of authentication failure.

8. A camera, comprising:
   a lens, configured for acquiring multiple face images of a face; and
   a processor, configured for obtaining at least one target face image that meets a preset condition from the multiple face images; receiving an ID image obtained by an ID reading support device; comparing the ID image with each target face image to obtain a person-ID document similarity for each target face image respectively; and, if the number of target face images with person-ID document similarities higher than a preset similarity threshold reaches a first preset number, determining that the authentication is successful;

wherein, the processor is specifically configured for:
based on a preset face scoring strategy, obtaining at least one target face image with a score higher than a preset score threshold from the multiple face images, wherein the preset face scoring strategy comprises factors containing at least one of front face, non-obscuration and clarity;
or,
based on the preset face scoring strategy, obtaining target face images that meet a second preset number from the multiple face images according to a descending order of the score.

9. The camera of claim 8, wherein, the lens is specifically configured for:
determining a region of interest for acquiring a face based on a preset installation position of the camera and a preset capture range; wherein, the preset installation position is an installation position that meets a preset height range and a preset depression angle range; and
continuously acquiring images in the region of interest, and determining face images in all images by a face recognition technology.

10. The camera of claim 8, wherein, the processor is further specifically configured for:
sending at least one of a target face image with a maximum person-ID document similarity, respective target face images, the ID image and a result of successful authentication to a client, so that the client displays at least one of:
the target face image with the maximum person-ID document similarity, respective target face images, the ID image and the result of successful authentication.

11. The camera of claim 8, wherein, the processor is further specifically configured for:
extracting face features from the ID image and each target face image to obtain face features of the ID image and face features of each target face image; and
matching the face features of the ID image with the face features of each target face image one by one, to obtain a person-ID document similarity for each target face image.

12. The camera of claim 8, wherein, the processor is further specifically configured for:
comparing a person-ID document similarity for each target face image with the preset similarity threshold in sequence, to obtain the number of target face images with person-ID document similarities greater than the preset similarity threshold by statistics; and
if the number of target face images with person-ID document similarities greater than the preset similarity threshold reaches the first preset number, determining that the authentication is successful.

13. The camera of claim 8, wherein, the processor is further specifically configured for:
if the number of target face images with person-ID document similarities not lower than the preset similarity threshold is lower than a third preset number, determining that the authentication fails, and outputting authentication failure information;
wherein, the processor is further specifically configured for:
sending at least one of a target face image with a maximum person-ID document similarity, respective target face images, the ID image and a result of authentication failure to a client, so that the client displays at least one of:
the target face image with the maximum person-ID document similarity, each target face image, the ID image and the result of authentication failure.

14. An authentication system for person-identity document comparison, comprising:
a camera, configured for acquiring multiple face images of a face; obtaining at least one target face image that meets a preset condition from the multiple face images; receiving an ID image obtained by an ID reading support device; comparing the ID image with each target face image to obtain a person-ID document similarity for each target face image respectively; and, if the number of target face images with person-ID document similarities higher than a preset similarity threshold reaches a first preset number, determining that the authentication is successful, wherein, obtaining at least one target face image that meets a preset condition from the multiple face images comprises: based on a preset face scoring strategy, obtaining at least one target face image with a score higher than a preset score threshold from the multiple face images, wherein the preset face scoring strategy comprises factors containing at least one of front face, non-obscuration and clarity; or, based on the preset face scoring strategy, obtaining target face images that meet a second preset number from the multiple face images according to a descending order of the score; and
an ID reading support device, configured for acquiring the ID image and sending the ID image to the camera.

15. The system of claim 14, wherein, the camera is connected to the ID reading support device via a connection port.

16. The system of claim 14, wherein, the system further comprises:
a client, configured for receiving and displaying at least one of: the target face image and a result of the authentication sent by the camera, and the ID image sent by the ID reading support device.

17. The system of claim 16, wherein, the camera sends the target face images and the result of the authentication to the client via a USB network adapter card; and
the ID reading support device sends the ID image to the client via the USB network adapter card.

18. The system of claim 14, wherein, the ID reading support device is specifically configured for:
acquiring ID information, and reading a face image corresponding to the ID information from an information base as the ID image;
or,
capturing and extracting a face image from the ID document as the ID image.

* * * * *